No. 729,452. PATENTED MAY 26, 1903.
H. A. TURNER.
FREIGHT CAR.
APPLICATION FILED OCT. 13, 1902.
NO MODEL. 3 SHEETS—SHEET 1.

Witnesses.
H. D. Kilgore
A. H. Opsahl

Inventor.
Howard A. Turner.
By his Attorneys,
Williamson & Merchant.

No. 729,452. PATENTED MAY 26, 1903.
H. A. TURNER.
FREIGHT CAR.
APPLICATION FILED OCT. 13, 1902.
NO MODEL. 3 SHEETS—SHEET 2.

Witnesses:
H. D. Kilgore
A. H. Opsahl

Inventor:
Howard A. Turner
By his Attorneys,
Williamson & Merchant

No. 729,452. PATENTED MAY 26, 1903.
H. A. TURNER.
FREIGHT CAR.
APPLICATION FILED OCT. 13, 1902.
NO MODEL. 3 SHEETS—SHEET 3.
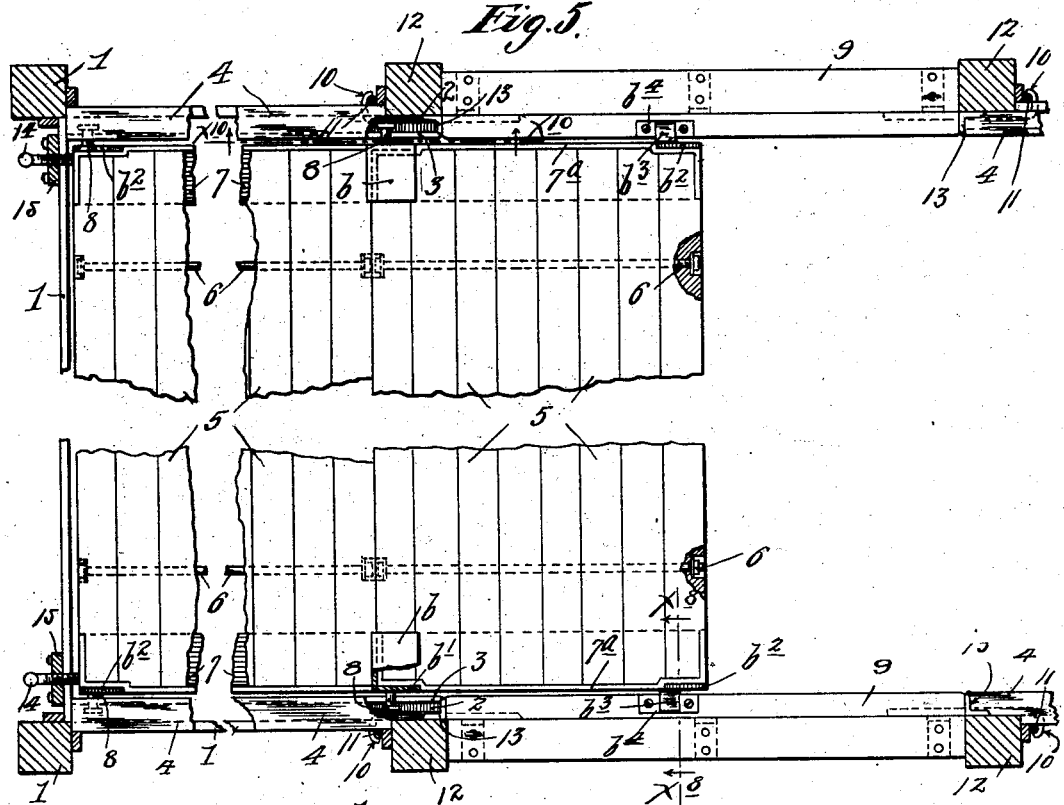
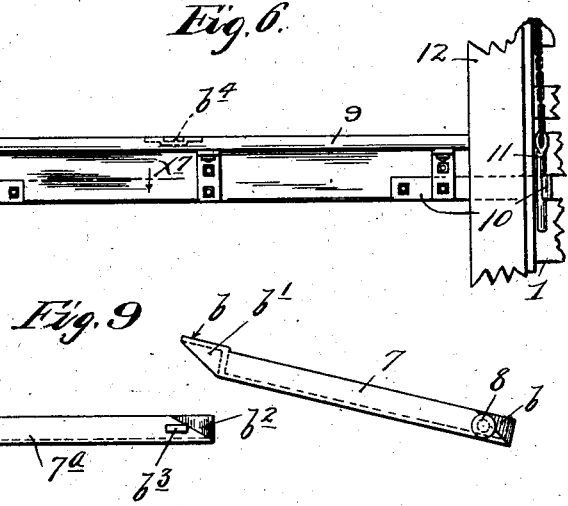
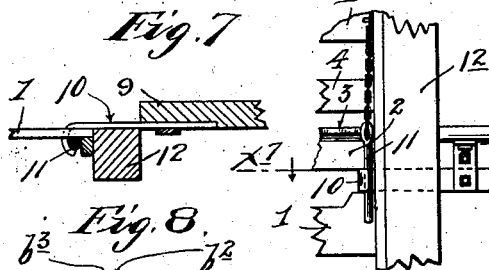
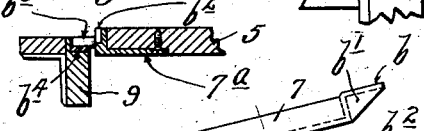
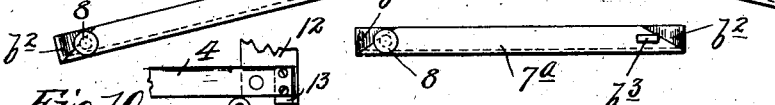
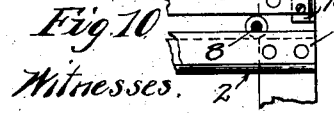
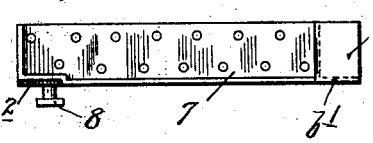
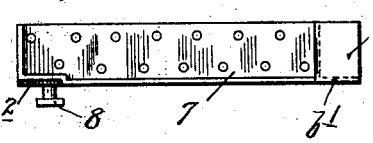
Witnesses.
H. S. Kilgore
A. H. Opsahl
Inventor.
Howard A. Turner.
By his Attorneys
Williamson & Merchant.
THE NORRIS PETERS CO., PHOTO-LITHO., WASHINGTON, D. C.

No. 729,452. Patented May 26, 1903.

UNITED STATES PATENT OFFICE.

HOWARD A. TURNER, OF MINNEAPOLIS, MINNESOTA.

FREIGHT-CAR.

SPECIFICATION forming part of Letters Patent No. 729,452, dated May 26, 1903.

Application filed October 13, 1902. Serial No. 126,999. (No model.)

*To all whom it may concern:*

Be it known that I, HOWARD A. TURNER, a citizen of the United States, residing at Minneapolis, in the county of Hennepin and State of Minnesota, have invented certain new and useful Improvements in Freight-Cars; and I do hereby declare the following to be a full, clear, and exact description of the invention, such as will enable others skilled in the art to which it appertains to make and use the same.

My invention has for its object to provide an improved car of the class convertible from single to multiple deckers for better adaptation to different classes of freight; and to this end my invention consists of the novel devices and combinations of devices hereinafter described, and defined in the claims.

The invention is illustrated in the accompanying drawings, wherein like notations refer to like parts throughout the several views.

Figure 1:
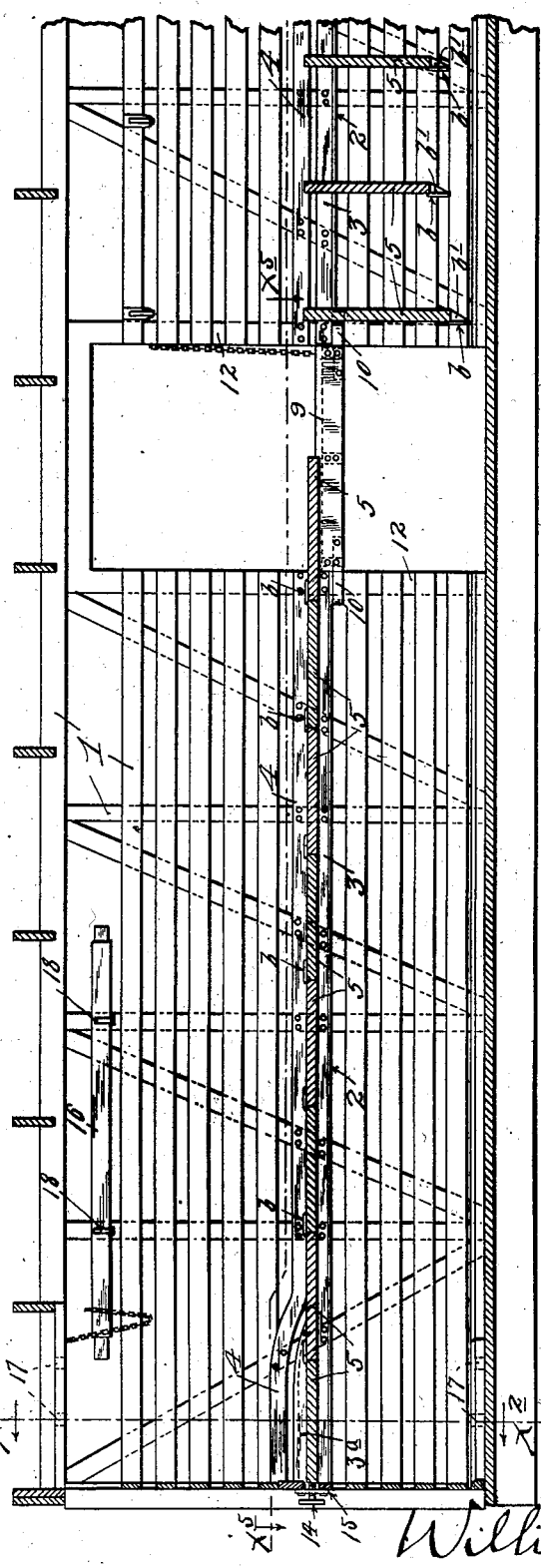
Figure 2:
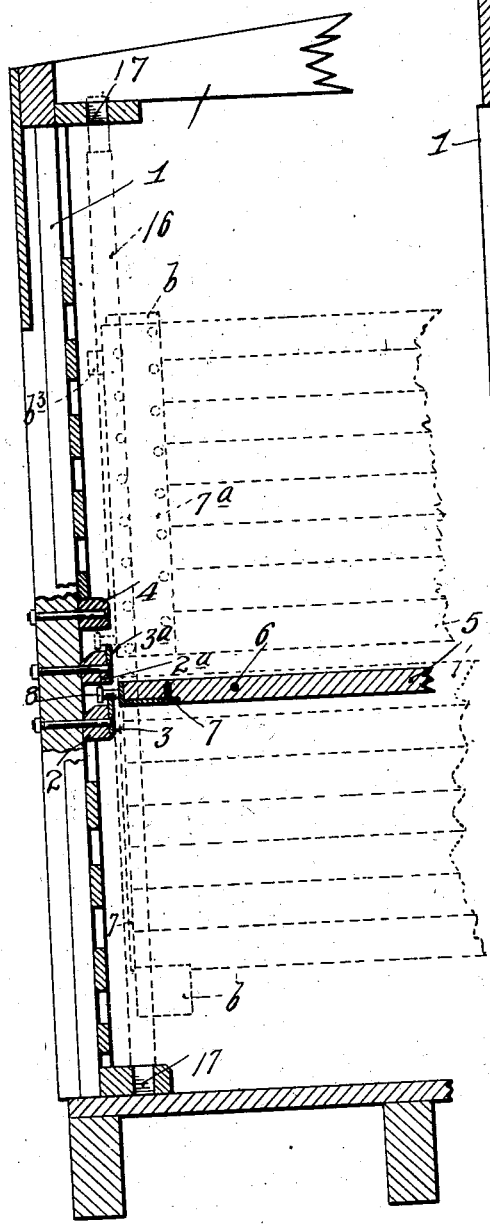
Figure 3:
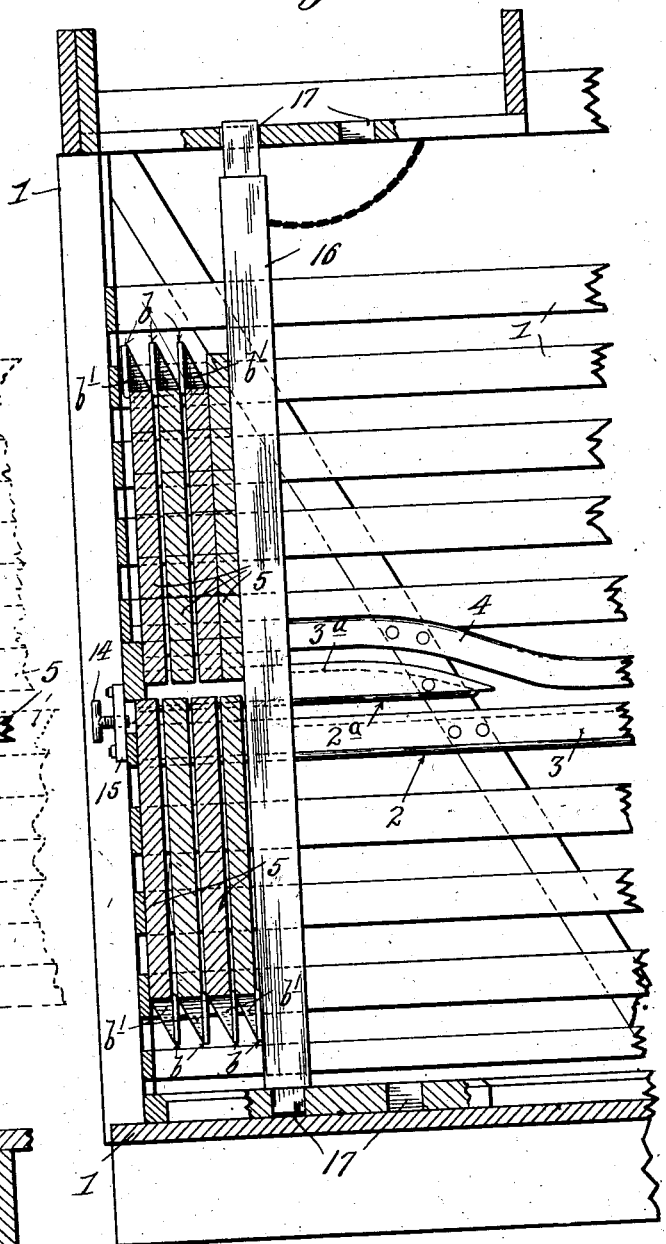
Figure 4:
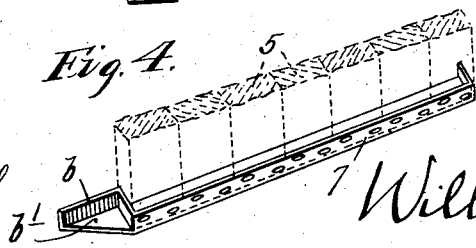

In the drawings, Figure 1 is a vertical longitudinal section through a car-body equipped with my improvements, some parts of the car-body being removed and others broken away. Fig. 2 is a cross-section on the line $x^2$ $x^2$ of Fig. 1, the full lines showing one of the deck-sections in working position and the dotted lines showing the sections as they may appear when in idle position. Fig. 3 is a central longitudinal vertical section through the end portions of the car-body on substantially the same line as Fig. 1, but with the deck-sections shown locked in idle position in the most compact form which they can take for securing clearance to the full height of the car. Fig. 4 is a detail in perspective for showing the overlapping members of the interlapping parts formed on the side castings of the deck-sections. Fig. 5 is a horizontal section through a part of the car-body on the line $x^5$ $x^5$ of Fig. 1 with some parts broken away and others removed. Fig. 6 is a detail in outside elevation, showing one of the bull-bars and its mounting to span the doorway of the car. Fig. 7 is a detail in horizontal section on the line $x^7$ $x^7$ of Fig. 6. Fig. 8 is a detail in vertical section on the line $x^8$ $x^8$ of Fig. 5. Fig. 9 is a detail in side elevation, showing three of the deck-sections separated from each other for illustrating the interlapping parts thereof. Fig. 10 is a detail in vertical section on the line $x^{10}$ $x^{10}$ of Fig. 5. Fig. 11 is a top plan view of one of the side castings of the deck-sections detached, and Fig. 12 is a bottom plan view of a portion of the same.

To the sides of the car-body 1, at the proper height above the floor of the car, are secured rail-supports 2, which extend from the door-posts to the ends of the car and have fixed thereto the main supporting-rails 3, on which the deck-sections are pivotally mounted with freedom for traveling or sliding movement lengthwise thereof. Near the ends of the car are also located short switch-sections composed of suitable supports $2^a$ and rails $3^a$, fixed thereto, the supports being made fast to the sides of the car at the proper level above the main supports 2 and the main rails 3. Guard-rails 4, shown as composed of wood, are fixed to the sides of the car directly above the rails 3 and $3^a$ and serve to hold the deck-sections from being lifted off from their supporting-rails. The deck-sections have batten-like bodies made up of cross-pieces 5, of wood, tied together by cross-rods 6, and are provided with side castings 7, to which the wooden slats or cross-pieces 5 are riveted or otherwise made fast. The side castings 7 are provided with headed trunnions 8, which serve as the pivotal bearings for connecting the deck-sections with their supporting-rails, the heads on the trunnions serving to interlock the deck-sections to the rails, so as to prevent the sections from being removed from the rails, while at the same time affording the freedom for the pivotal and sliding movements of the sections. The pivotal trunnions 8 are located near one end of the castings 7, and at their opposite ends the said castings 7 are provided with projecting lugs or fingers $b$ $b'$, which form the overlapping members of interlapping parts which coöperate when the deck-sections are in working position to support the deck-sections at their forward ends. The underlapping members of said interlapping parts are afforded by shouldered seats $b^2$ at the trunnion ends of said castings 7. The part $b$ of the lugs or fingers $b$ $b'$ is horizontal, and the part $b'$ is a triangular vertical web connecting the part $b$ with the body of the casting. The shouldered seat $b^2$ on the rear end of the casting 7 is of corresponding shape, so as to receive said vertical web $b'$ of the next rearward section-casting and permit the part $b$ of said rearward casting to overlap the rear end of the next forward casting 7 when the parts are in working position. The shape and relations of these interlapping parts of said castings 7 are best shown in Figs. 4, 5, 9, 11, and 12. From an inspection of these views it will be seen that the side castings 7 are applied to the wooden or body portions of the deck-sections, so as to bring the trunnions 8 near the ends of the said sections to face the ends of the car, and for that reason the trunnion ends of the sections have been treated as the rear ends thereof.

The description above given of the interlapping parts on said castings 7 apply to all thereof with the exception of a single deck-section. One of the central deck-sections which coöperate to span the door-space when in working position has side castings $7^a$ without the fingers $b\ b'$, but provided at each end thereof with the shouldered seats $b^2$, as best shown in Fig. 9. This is done so that this particular central section, with the side castings $7^a$, can coöperate with the overlapping members $b\ b'$ of the adjacent sections in each direction. Otherwise stated, all the other deck-sections are made rights and lefts with respect to each other, and hence this single central section must have the castings $7^a$ each with a pair of seats $b^2$, but without the fingers $b\ b'$. This central section having the castings $7^a$ is then provided with lateral rest-lugs $b^3$, formed integral with said castings $7^a$, and which lugs $b^3$ rest in countersunk seats $b^4$, provided for that purpose on the faces of the flanged bull-bars 9, that span the door-spaces when the parts are in working position. The bull-bars 9 therefore coöperate or constitute parts of the supporting-rails for the deck-sections. Said bars 9 are provided with hook-ended hasps 10, adapted to extend inward beyond the inner faces of the side slats of the car-body and to be engaged by chain-held bolts 11 when in working position, as best shown in Fig. 6. This construction permits the bull-bars to be entirely removed or to be swung on one of the chain-bolts 11 as a hinge, as may be desired.

To the door-posts 12 of the car-body between the supporting-rails 3 and the guard-rails 4 are fixed angle-iron stop-brackets 13, properly disposed to engage or come into the path of the trunnions 8 and limit the movement of any given deck-section crosswise of the doorways, and thereby prevent the deck-sections from being pulled off from their supporting-rails and removed through the door-openings. These stop-brackets 13 do not fill the entire space between the supporting guard-rails, but stop short of the latter, so as to afford clearance for the rest-lugs $b^3$ of the deck-sections, having the castings $7^a$ to pass thereunder to assume the position shown in Fig. 5.

Headed set-screw bolts 14 work through resistance-blocks 15, fixed to the ends of the car, and bear against the rear ends of the end deck-sections when the deck-sections are in working position and afford a means for forcing the deck-sections closely together with their interlapping parts in proper working relation in respect to each other. The inturned horizontal flanges of the bull-bars 9 fit between the pairs of door-posts 12, and hence the bull-bars are held from longitudinal motion. As the deck-section having the casting $7^a$ is provided with the side lugs $b^3$ resting in the countersunk seats $b^4$ on the face of the bull-bars, it follows that the seats $b^4$ on the bull-bars serve to hold the said deck-section in a stationary position and afford a base of resistance for the clamping action of the headed screw-bolts 14, working on the rearmost deck-section and acting through the intermediate sections. When the deck-sections are in working position, they may therefore appear as shown in the left-hand half of the car in Fig. 1. If then it be desired to convert the car into a single-decker, this may be readily done by first permitting the deck-sections to drop on their pivotal bearings, as shown at the right in Fig. 1, and then moving the same lengthwise of their supporting-rails to bring the same into compact bunches at the ends of the car. The necessary release of the sections from each other at their interlapped parts in order to secure freedom for the pivotal action can be had either by manipulating the central section having the side castings $7^a$ or by manipulating the rearmost section after turning the lock-bolts 14 outward to their limit. If the central section be manipulated, all that is necessary is to lift the forward end of the same so as to make its lugs $b^3$ clear the lug-seats $b^4$ of the bull-bar and then move the section crosswise of the doorway, so as to draw the trunnions toward the stop-arms 13. The next rearward section will then drop on its pivotal bearings and permit all the others to follow. If the rearmost section be manipulated, it can be turned up after release from the screw-bolts 14 and the next adjacent section be pulled rearward until it can drop, thereby permitting all the others to drop in regular order. The central section having the casting $7^a$ may also be made to drop by the removal of the bull-bars 9 and will drop whenever they are removed. The deck-sections having thus been released from each, so as to be free to turn on their pivotal bearings, they can be made to move lengthwise of their supporting-rails and bunched as desired at the ends of the car. If, for example, the largest amount of clearance from top to bottom of the car is desired, as for cattle, the sections may be bunched, as shown in Fig. 3, from an inspection of which view it will be seen that part of the sections have been shifted onto the switch-rail $3^a$ and turned upward and the others left on the main rail 3 and turned downward, thereby bringing the two sets into vertical alinement and taking up the least possible space lengthwise of the car. The stanchions 16 are then applied to hold the section so bunched in their idle positions. As shown, the stanchions 16 have reduced ends which engage with mortised seats 17, provided above and below in the car-body, to hold the stanchions in working position. As shown, the stanchions 16 are chained to the car-body and when in idle position may be held up by hooks 18 near the roof of the car, as clearly shown in Fig. 1.

If it be desired to use the car for lumber or other freight requiring the largest clearance in the upper part of the car-body, the deck-sections would all be turned downward on their main supporting-rails and be bunched in their lowest position at the ends of the car. This is desirable for lumber in order to keep the necessary clearance for opening the end doors or windows of the car to admit the long lumber. If it be desired to use the car for railway-rails or other heavy material which must be loaded on the floor of the car, all the deck-sections may be turned upward when in their idle positions, thus affording the largest clearance in the lower part of the car. In all positions which the deck-sections may take they remain interlocked or held fast to the car, so that they cannot become lost or be removed therefrom without doing violence to the car.

One important advantage of the invention herein disclosed is the facility with which the intermediate deck can be cleaned from the accumulations which occur under the use of the same. By simply dropping the deck-sections on their pivotal bearings the accumulated material will be loosened up and dropped down onto the floor of the car, where it can be much more readily disposed of than from an intermediate rigid deck.

It will of course be understood that many features of the construction shown may be changed without departing from the spirit of the invention.

It should be noted that the supporting-rails 3 and $3^a$ rise above the faces of the rail-supports 2 and that the heads on the trunnions 8 interlock with the projecting parts of said supporting-rails. Hence the decks are not only interlocked against removal from the car, but the sides of the car are interlocked with each other by the intervening deck-sections when the latter are in working position, and hence the deck-sections will strengthen the car and tend to prevent the separation of the sides of the car in case of accident.

It must be understood, of course, that the overlapping members $b\ b'$ of the interlapping parts on the deck-castings 7 are species of rest-lugs for supporting the so-called "forward" ends of said deck-sections. It is equally obvious that different forms of rest-lugs might be employed and that instead of resting on the next forward deck-sections they might be applied to rest on the rails like the lateral rest-lugs $b^3$ of the central deck-sections having the side castings $7^a$.

Attention is further called to the fact that some of the features of the construction disclosed in this application were disclosed and are claimed in my pending application, Serial No. 92,992, filed February 7, 1902, and allowed May 28, 1902, entitled "Freight-cars."

It should also have been noted that the release of the deck-sections from each other when in working position may be made by first lifting up the section to the right of the central section having the castings $7^a$, then lifting the said central section and letting said right-hand section drop. This is perhaps the most convenient way of manipulation to secure the release and the drop.

What I claim, and desire to secure by Letters Patent of the United States, is as follows:

1. In a car, the combination with supporting-rails on the sides of the car-body, of deck-sections pivotally mounted on the said rails and movable lengthwise thereof for permitting said deck-sections to coöperate with each other to afford a continuous deck when in working position, or to be bunched at the end of the car in idle position, substantially as described.

2. In a car, the combination with supporting and guard rails on the sides of the car-body, of deck-sections pivotally mounted on said supporting-rails and movable lengthwise thereof for permitting said sections to coöperate to form a continuous deck when in working position, and to be bunched, at the end of the car, when in idle position, the said deck-sections and the said rails being constructed to interlock with each other, in all positions assumed by said sections for preventing the removal thereof from the car, substantially as described.

3. In a car, the combination with supporting-rails on the sides of the car-body, of deck-sections pivotally mounted on the said rails and movable lengthwise thereof, and provided with rest-lugs which coöperate with the pivots to support the deck-sections on the said rails when in their working position substantially as described.

4. In a car, the combination with supporting-rails on the sides of the car-body, of deck-sections pivotally mounted on the rails and movable lengthwise thereof, and provided with interlapping parts, the pivots and the overlapping members of the interlapping parts being at opposite ends of the deck-sections, substantially as and for the purposes set forth.

5. In a car, the combination with supporting-rails on the sides of the car-body, of deck-sections pivotally mounted on the said rails and movable lengthwise thereof, which supporting-rails are provided near the ends of the car, with switch-sections affording a double track whereby the said sections, when in idle position, can be turned, part thereof upward and part thereof downward into vertical alinement with each other, and thereby be bunched in small compass, at the end of the car, substantially as described.

6. In a car, the combination with supporting-rails on the sides of the car-body, of deck-sections pivotally mounted on the said rails and movable lengthwise thereof, for permitting said deck-sections to coöperate with each other to afford a continuous deck, when in working position, or to be bunched, at the end of the car, when in idle position, and a retaining device for holding the said deck-sections bunched in idle position, substantially as described.

7. In a car, the combination with supporting-rails on the sides of the car-body, of deck-sections pivotally mounted on the said rails and movable lengthwise thereof, for the purposes stated, and a stanchion engageable with the car-body to retain the said sections bunched in idle position, substantially as described.

8. In a car, the combination with supporting-rails on the sides of the car-body, of deck-sections pivotally mounted on the said rails and movable lengthwise thereof, which supporting-rails are provided, near the ends of the car, with switch-sections affording a double track at the ends of the car, whereby said deck-sections, when in idle position, can be turned, part thereof upward and part thereof downward, into vertical alinement with each other so as to bunch the same, in small compass, at the ends of the car, and stanchions engageable with the car-body to retain the said deck-sections so bunched in idle position, substantially as described.

9. In a car, the combination with supporting-rails on the sides of the car-body, of deck-sections pivotally mounted on the rails and movable lengthwise thereof, and set-screws working through fixed bases of resistance against the end members of the deck-sections for locking the same together, in working position, substantially as described.

10. In a car, the combination with supporting-rails on the sides of the car-body, of deck-sections pivotally mounted on the rails and movable lengthwise thereof and provided with interlapping parts, the pivots and the overlapping members of the interlapping parts being at opposite ends of the sections, and set-screws working through fixed bases of resistance against the end members of the said deck-sections for securely locking the deck-sections in working position with their interlapping parts in engagement with each other, substantially as described.

In testimony whereof I affix my signature in presence of two witnesses.

HOWARD A. TURNER.

Witnesses:
H. D. KILGORE,
F. D. MERCHANT.